(12) United States Patent
Indalkar

(10) Patent No.: US 8,631,423 B1
(45) Date of Patent: Jan. 14, 2014

(54) TRANSLATING INPUT/OUTPUT CALLS IN A MIXED VIRTUALIZATION ENVIRONMENT

(75) Inventor: Sujata Indalkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 142 days.

(21) Appl. No.: 13/252,285

(22) Filed: Oct. 4, 2011

(51) Int. Cl.
*G06F 3/00* (2006.01)

(52) U.S. Cl.
USPC .......................................................... 719/328

(58) Field of Classification Search
USPC ...................................... 719/328, 330; 718/1
See application file for complete search history.

(56) References Cited

U.S. PATENT DOCUMENTS

| | | | |
|---|---|---|---|
| 8,037,016 B2 * | 10/2011 | Odulinski et al. ............ | 707/602 |
| 8,042,103 B2 | 10/2011 | Burka et al. | |
| 8,065,677 B2 | 11/2011 | Sen et al. | |
| 8,181,174 B2 | 5/2012 | Liu | |
| 8,327,358 B2 | 12/2012 | Mangione-Smith | |
| 8,352,938 B2 | 1/2013 | Hunt et al. | |
| 2008/0028402 A1 * | 1/2008 | Senoo ............................... | 718/1 |
| 2011/0179082 A1 * | 7/2011 | Vaghani et al. ............... | 707/781 |
| 2012/0110574 A1 * | 5/2012 | Kumar ............................. | 718/1 |

OTHER PUBLICATIONS

Bryan D. Payne, Secure and Flexible Monitoring of Virtual machines, 2007.*
"Open Virtualization Format White Paper;" Distributed Management Task Force, Inc. (DMTF), published Feb. 6, 2009, DSP2017; pp. 1-39.
Liebmann, Lenny; "Boosting ROI with Multi-Vendor Virtualization: How a Mixed Hypervisor Environment Can Benefit Your Business;" A UBM Techweb White Paper, Microsoft and Dell, Apr. 2011; pp. 1-7.

\* cited by examiner

*Primary Examiner* — Lechi Truong
(74) *Attorney, Agent, or Firm* — Meyertons Hood Kivlin Kowert & Goetzel

(57) ABSTRACT

Various embodiments of a system and method for enabling a first virtualization environment to use a virtual disk image file created by a second virtualization environment without requiring the virtual disk image file to first be converted are described. The virtual disk image file may remain in its original format, and an I/O conversion filter driver may receive I/O requests from the first virtualization environment in real time and dynamically translate them into modified I/O calls based on the original format of the virtual disk image file.

15 Claims, 6 Drawing Sheets

TRANSLATING INPUT/OUTPUT CALLS IN A MIXED VIRTUALIZATION ENVIRONMENT

BACKGROUND OF THE INVENTION

1. Field of the Invention

This invention relates to the field of virtual computer systems, and more particularly, to a system and method for enabling one type of virtualization environment to use a virtual disk image file created by another type of virtualization environment.

2. Description of the Related Art

A virtualization environment is a software application that implements an environment in which virtual machines can run. A virtual machine (VM), also referred to as a virtual computer, is a software implementation of a machine (computer) that executes programs like a real machine. Virtualization provides the ability for multiple virtual machines to run together on the same physical computer. The virtualization environment includes a hypervisor that executes on the physical computer and manages the various virtual machines. Each virtual machine may execute its own operating system and may appear to a user of the virtual machine to be the same as an independent physical computer.

A user may interact with a virtual machine similarly as if the user were interacting with a physical computer. For example, various software applications may be installed on the virtual machine, and the virtual machine may enable the user to launch the software applications, provide input to the software applications, and view output from the software applications identically as if they were executing on a physical computer.

A virtual machine typically maintains its own set of files, similarly as a physical computer would, such as operating system files, application program files, data files, etc. Whereas the files of a physical computer are typically stored on a hard disk, files of a virtual machine are often stored in one or more virtual disk image files.

SUMMARY

Various embodiments of a computer-accessible storage medium, system, and method are disclosed. According to one embodiment, the method may comprise intercepting a first input/output call from a first virtualization environment that uses a first virtual disk image format. The input/output call may be created by the first virtualization environment based on the first virtual disk image format. The method may further comprise translating the first input/output call into a second input/output call based on a second virtual disk image format used by a second virtualization environment, and directing the second input/output call to a virtual disk image file created by the second virtualization environment. The virtual disk image file may be formatted according to the second virtual disk image format.

In some embodiments the first input/output call may specify a first file offset, and translating the first input/output call into the second input/output call may include mapping the first file offset to a second file offset. The second input/output call may specify the second file offset.

Further embodiments of the method may comprise directing the second input/output call to the virtual disk image file created by the second virtualization environment by passing the second input/output call to a file system in which the virtual disk image file is stored.

In some embodiments the method may be implemented by program instructions executed by one or more processors of a first computer system, and the first input/output call may originate from the first virtualization environment on a second computer system coupled to the first computer system by a network.

In some embodiments the method may comprise determining whether or not the first input/output call originated from the first virtualization environment. The first input/output call may be translated into the second input/output call in response to determining that the first input/output call did originate from the first virtualization environment.

In some embodiments the first input/output call may be a first call for reading data. The first input/output call may be created by the first virtualization environment based on the first virtual disk image format. The second input/output call may be a second call for reading data from the second virtual disk image format.

In some embodiments the first input/output call may be a first call for writing data. The first input/output call may be created by the first virtualization environment based on the first virtual disk image format. The second input/output call may be a second call for writing data to the second virtual disk image format.

In some embodiments the method may further comprise instantiating a virtual machine in the first virtualization environment from the virtual disk image file created by the second virtualization environment. The first input/output call may be intercepted from the first virtualization environment in response to the first virtualization environment using the virtual machine.

In some embodiments the method may comprise instantiating the virtual machine in the first virtualization environment from the virtual disk image file without first converting the virtual disk image file into the first virtual disk image format.

In various embodiments, the first virtual disk image format and the second virtual disk image format may each be any particular virtual disk image format. For example, in some embodiments the first virtual disk image format or the second virtual disk image format may be a VMDK (Virtual Machine Disk Format) file format. As another example, in some embodiments the first virtual disk image format or the second virtual disk image format may be a VHD (Virtual Hard Disk) file format.

The computer-accessible storage medium may store program instructions executable by one or more processors to intercept a first input/output call from a first virtualization environment that uses a first virtual disk image format. The input/output call may be created by the first virtualization environment based on the first virtual disk image format. The program instructions may be further executable by the one or more processors to translate the first input/output call into a second input/output call based on a second virtual disk image format used by a second virtualization environment, and to direct the second input/output call to a virtual disk image file created by the second virtualization environment. The virtual disk image file may be formatted according to the second virtual disk image format. In further embodiments the program instructions may be further executable by the one or more processors to perform additional aspects of the method outlined above.

The system may comprise one or more processors and memory storing program instructions. The program instructions may be executable by the one or more processors to intercept a first input/output call from a first virtualization environment that uses a first virtual disk image format. The input/output call may be created by the first virtualization environment based on the first virtual disk image format. The program instructions may be further executable by the one or more processors to translate the first input/output call into a second input/output call based on a second virtual disk image format used by a second virtualization environment, and to direct the second input/output call to a virtual disk image file created by the second virtualization environment. The virtual disk image file may be formatted according to the second virtual disk image format. In further embodiments the program instructions may be further executable by the one or more processors to perform additional aspects of the method outlined above.

Figure 1:
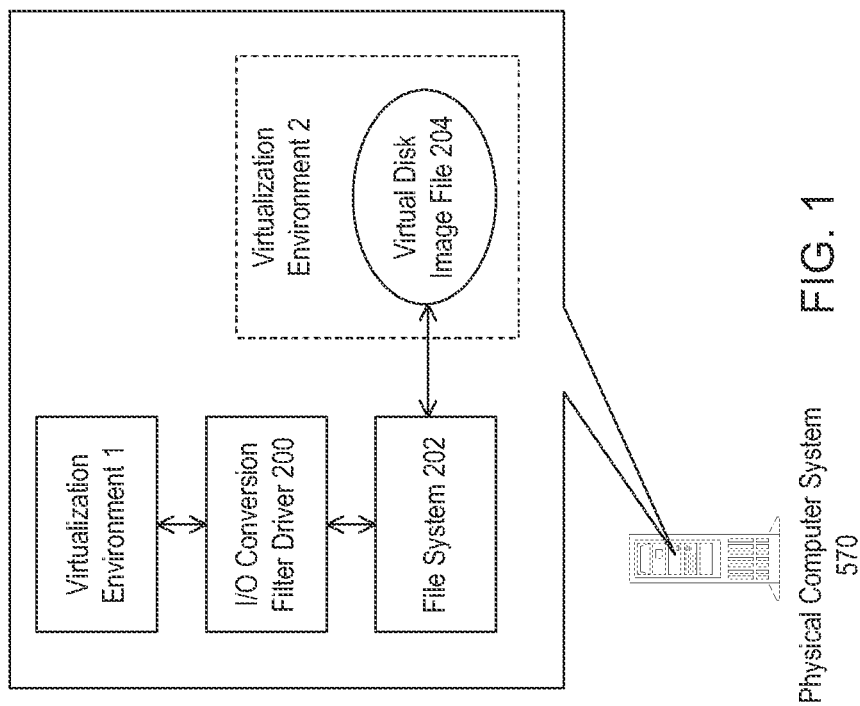
FIG. 1 illustrates a physical computer system that is configured to execute software implementing two different virtualization environments for instantiating and executing virtual machines.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a physical computer system 570 that is configured to execute software implementing two different virtualization environments (the virtualization environment 1 and the virtualization environment 2) for instantiating and executing virtual machines. For example, the two virtualization environments may be developed by two different software vendors or organizations.

Each virtual machine that executes in one of the respective virtualization environments may use one or more corresponding virtual disk image files. A virtual disk image file represents the contents and structure of a hard disk drive, e.g., by representing disk sectors. Sectors of the virtual disk image file may be allocated as necessary to store the files used by the virtual machine. In addition to the sector data, the virtual disk image file also includes meta-data structures for managing the sector data, such as a sector bitmap indicating which sectors are currently in use.

A virtual disk image file may be formatted according to a particular format or specification that specifies how the contents of the virtual disk image file are structured. The two virtualization environments 1 and 2 may each use a different virtual disk image format. For example, in some embodiments one of the virtualization environments may be developed by VMware, Inc., and may use a Virtual Machine Disk Format (VMDK) format (e.g., any documented version of the VMDK format). As another example, in some embodiments one of the virtualization environments may be developed by Microsoft Corp., and may use a Virtual Hard Disk (VHD) format (e.g., any documented version of the VHD format). In other embodiments, the virtualization environments may be any other kind of virtualization environment (e.g., may be developed by any other organization or vendor), and may use any other virtual disk image format.

Since the virtualization disk image formats are different, a virtual disk image file created by one of the virtualization environments may not be directly useable by the other virtualization environment. The sector data stored in the virtual disk image files (e.g., the actual file data that represents the virtual machine files stored on the virtual disk sectors) may be the same for both virtualization disk image formats, but the meta-data that is used to manage the sector data may be structured differently. Also, one of the virtualization environments may expect the sector data in its virtual disk image files to begin at a particular offset within the virtual disk image file, whereas the other virtualization environments may expect the sector data in its virtual disk image files to begin at another offset.

Although the virtual disk image formats used by the two virtualization environments may be different, it may still be desirable to enable one of the virtualization environments to use a virtual disk image file created by the other virtualization environment, e.g., to enable the virtualization environment 1 to instantiate a virtual machine from a virtual disk image file created by the virtualization environment 2. One approach to this problem could be to perform a conversion process to convert the entire virtual disk image file from the format used by the virtualization environment 2 into the format used by the virtualization environment 1. However, the conversion process may be very time-consuming, which may mean that the virtual machine cannot be instantiated quickly if the corresponding virtual disk image file has to first be converted to the other format. Also, if the virtual disk image file later needs to be used again in the virtualization environment 2 that originally created it then the file may need to undergo another time-consuming conversion process may to the original virtual disk image format.

Various embodiments of the system and method disclosed herein may enable one of the virtualization environments (e.g., the virtualization environment 1) to use a virtual disk image file created by the other virtualization environment (e.g., the virtualization environment 2) without requiring the virtual disk image file to first be converted to the virtual disk image format normally required by the virtualization environment 1. As illustrated in FIG. 1, an input/output (I/O) conversion filter driver 200 may be executed by the physical computer system 570. The I/O conversion filter driver 200 is a software program or set of program instructions that acts as an intermediary between the virtualization environment 1 and a virtual disk image file 204 that was originally created by the virtualization environment 2. In some embodiments the virtualization environment 2 may not actually need to be executed by the physical computer system 570 at the time the virtual disk image file 204 is used by the virtualization environment 1, and may not even need to be installed on the physical computer system 570. The virtualization environment 2 is shown in FIG. 1 to illustrate that the virtual disk image file 204 was created by the virtualization environment 2 (possibly on a different physical computer system) and uses a different format than the virtual disk image format expected by the virtualization environment 1.

The virtualization environment 1 may operate normally by directing programmatic I/O calls or requests to a virtual disk image file 204, e.g., to read data from the disk sectors represented in the virtual disk image file 204 and write data to the disk sectors represented in the virtual disk image file 204. The virtualization environment 1 may expect the virtual disk image file 204 to be in a particular virtual disk image format, e.g., where the sector data is expected to begin at a particular offset within the file. Thus, for example, to read data from a given sector in the virtual disk image file 204, the virtualization environment 1 may issue a read I/O call that specifies the virtual disk image file 204 pathname or ID, the number of bytes to read, and the file offset corresponding to the sector from which to read, e.g., where the virtualization environment 1 calculates the offset based on its knowledge of the native virtual disk image format normally used by the virtualization environment 1. Similarly, to write data to a given sector in the virtual disk image file 204, the virtualization environment 1 may issue a write I/O call that specifies the virtual disk image file 204 pathname, the file offset corresponding to the sector at which to write, and the data to be written.

In a conventional system these I/O calls may be received by the file system, which may then read the requested data from the virtual disk image file or write the specified data to the virtual disk image file. In the system of FIG. 1, however, the I/O conversion filter driver 200 may intercept the I/O calls from the virtualization environment 1 before they are received by the file system 202. In response to intercepting each I/O call, the I/O conversion filter driver 200 may translate the I/O call into a modified I/O call based on the virtual disk image format used by the virtualization environment 2. For example, if the I/O call specifies a file offset at which to begin reading or writing, the I/O conversion filter driver 200 may translate the I/O call by modifying the offset to a different offset. More particularly, the I/O conversion filter driver 200 may determine which offset in the virtual disk image format used by the virtualization environment 2 maps to the offset specified in the I/O call. For example, the I/O conversion filter driver 200 may determine that the offset specified in the I/O call would correspond to a particular sector number "N" in the virtual disk image format used by the virtualization environment 1. The I/O conversion filter driver 200 may then determine that the sector number "N" in the virtual disk image format used by the virtualization environment 2 corresponds to a different offset, and may substitute this different offset in the I/O call instead of the originally specified offset.

After translating each I/O call, the I/O conversion filter driver 200 may direct the translated I/O call to virtual disk image file 204. For example, the translated I/O call may be passed to the file system 202 which then performs the specified I/O operation on the virtual disk image file 204.

Thus, the virtual disk image file 204 may remain in its original format, and the I/O conversion filter driver 200 may receive I/O requests from the virtualization environment 1 in real time and dynamically translate them into modified I/O calls based on the original format of the virtual disk image file 204. In this way, the virtualization environment 1 may be able to instantiate and use a virtual machine based on the virtual disk image file 204 created by the virtualization environment 2. Since the virtual disk image file 204 remains in its original format, the virtualization environment 2 may still be able to use the native virtual disk image file 204 later even after it has been modified by the virtualization environment 1.

Figure 2:
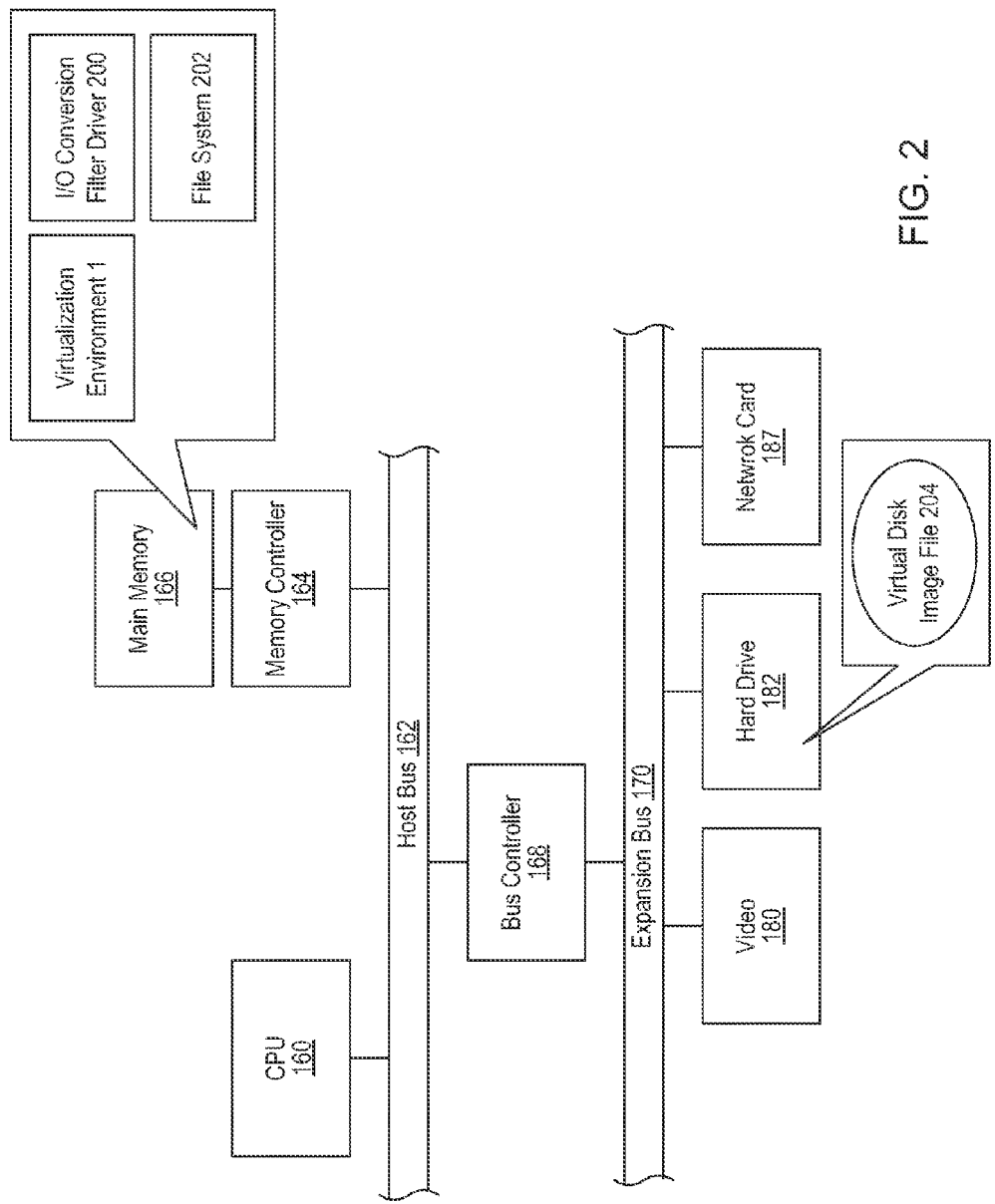
FIG. 2 illustrates one embodiment of the physical computer system in more detail.

In various embodiments, the virtualization environment 1, the I/O conversion filter driver 200, and the file system software 202 may execute on any kind of physical computer system 570, such as a personal computer system (PC), workstation, network appliance, distributed computer system, handheld device, or other computing device or combinations of devices. In general, the term "computer system" can be broadly defined to encompass any device (or combination of devices) having at least one processor that executes instructions from one or more storage mediums. FIG. 2 illustrates one embodiment of a physical computer system 570 in more detail. The physical computer system 570 may have any configuration or architecture, and FIG. 2 illustrates a representative PC embodiment. Elements of a computer not necessary to understand the present description have been omitted for simplicity.

The physical computer system 570 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the physical computer system 570 may include multiple processors 160.

The physical computer system 570 may also include memory 166 in which program instructions implementing the virtualization environment 1, the I/O conversion filter driver 200, and the file system software 202 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the physical computer system 570. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, as well as one or more hard disk drives 182 or other storage device which stores information in a non-volatile manner. The physical computer system 570 may also include a network card or device 187 that enables the physical computer system 570 to send and receive information over a network. In some embodiments the virtual disk image file 204 may be stored on the hard drive 182. In other embodiments the virtual disk image file 204 may be stored on a storage device accessible to the physical computer system 570 through the network.

In some embodiments the system may use more than one physical computer system. For example, the virtualization environment 1 may be executed by one physical computer system, and the I/O conversion filter driver 200 may be executed by a second physical computer system, e.g., where the virtual disk image file 204 is stored on the second physical computer system or on a storage device coupled to the second physical computer system.

Figure 3:
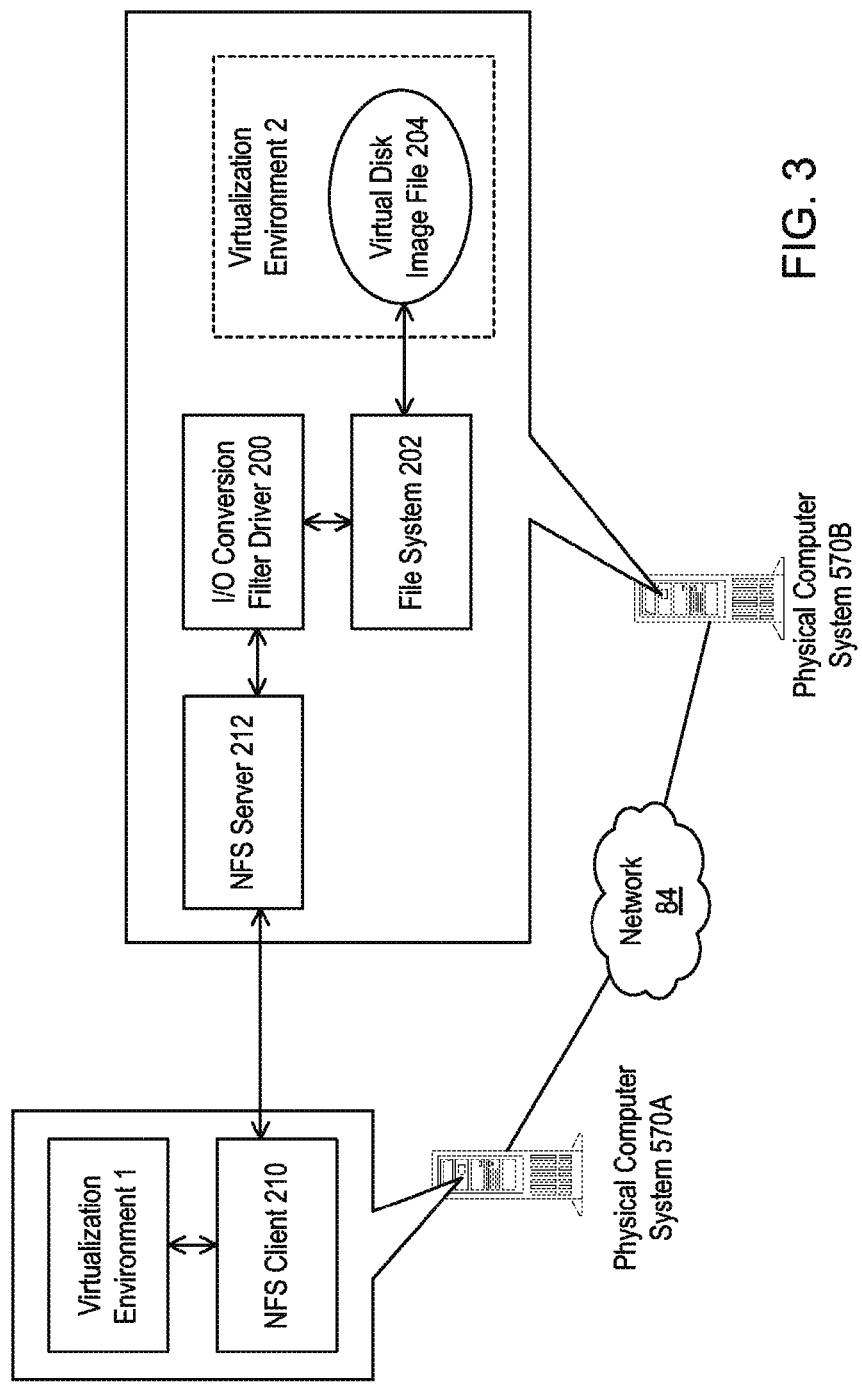
FIG. 3 illustrates another embodiment which uses two different physical computer systems.

For example, FIG. 3 illustrates an embodiment in which a physical computer system 570A is coupled to a physical computer system 570B through a network 84. The network 84 may include any type of network or combination of networks. For example, the network may include any type or combination of local area network (LAN), a wide area network (WAN), wireless networks, an Intranet, the Internet, etc.

Examples of local area networks include Ethernet networks, Fiber Distributed Data Interface (FDDI) networks, and token ring networks. The computer systems may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

In the embodiment of FIG. 3, the system uses a NFS (Network File System) file system. The virtualization environment 1 executes on the physical computer system 570A. The I/O calls originating from the virtualization environment 1 are received by the NFS client software 210 and transmitted across the network 84 to the NFS server software 212 executing on the physical computer system 570B. The I/O conversion filter driver 200 may execute on the physical computer system 570B to intercept the I/O calls from the NFS server software 212 and translate them into modified I/O calls based on the virtual disk image format of the virtual disk image file 204, similarly as described above. The I/O conversion filter driver 200 may then pass the modified I/O calls to the file system software 202 which performs the specified I/O operations on the virtual disk image file 204.

Figure 4:
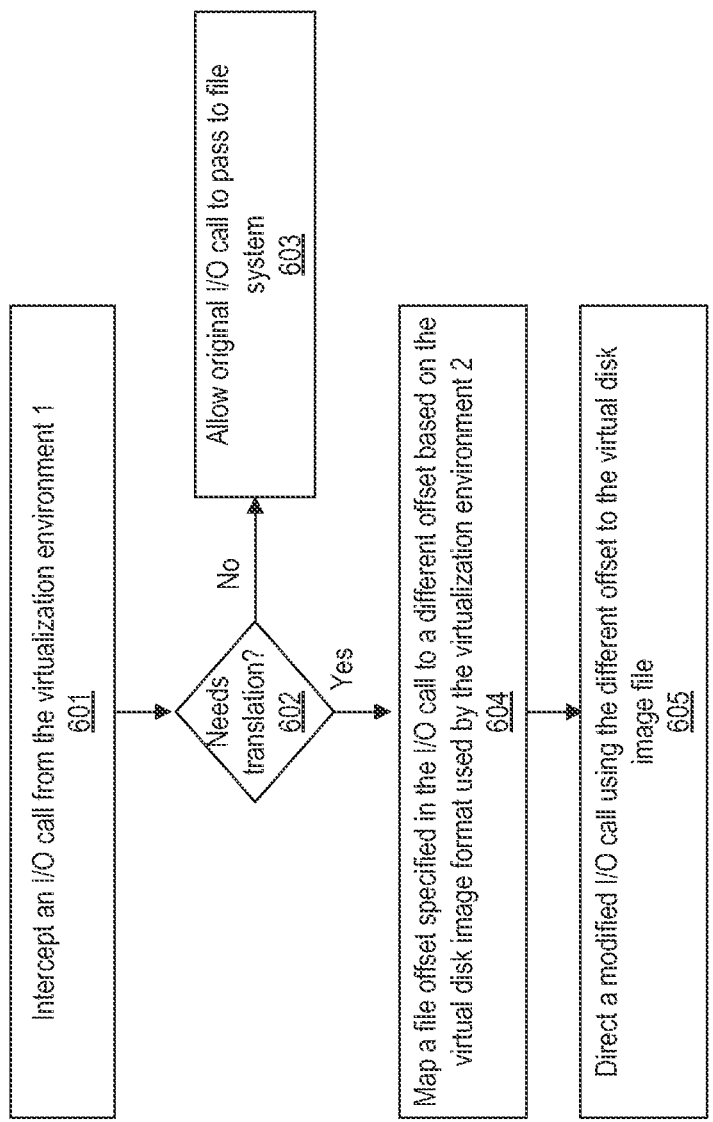
FIG. 4 is a flowchart diagram illustrating one embodiment of a method for translating an I/O call originating from one virtualization environment that uses one virtual image file format into a modified I/O call based on a different virtual image file format.

In various embodiments the I/O conversion filter driver 200 may perform the functionality of translating the I/O calls intercepted from the virtualization environment 1 in any of various ways, e.g., depending on the particular virtual disk image format natively used by the virtualization environment 1 and the particular virtual disk image format natively used by the virtualization environment 2. FIG. 4 is a flowchart diagram illustrating one embodiment of a method for translating an I/O call. The method may be implemented by the I/O conversion filter driver 200 which is executed by one or more physical processors.

As indicated in block 601, the I/O conversion filter driver 200 may intercept an I/O call that originates from the virtualization environment 1. For example, the virtualization environment 1 may direct the I/O call to the virtual disk image file created by the virtualization environment 2. In some embodiments the virtual disk image file may be stored in a particular file system or volume, and the I/O conversion filter driver 200 may be configured to intercept any I/O calls directed to the file system or volume. As indicated in block 602, the I/O conversion filter driver 200 may determine whether the I/O call needs to be translated, e.g., by checking whether it originated from the virtualization environment 1 and/or checking which file the I/O call is directed to. If the I/O conversion filter driver 200 determines that the I/O call does not need to be translated (e.g., because it did not originate from the virtualization environment 1) then the I/O conversion filter driver 200 may simply allow the original I/O call to pass to the file system, as indicated in block 603.

If the I/O conversion filter driver 200 determines that the I/O call needs to be translated then the I/O conversion filter driver 200 may translate the I/O call based on the virtual disk image format used by the virtualization environment 2. For example, the original I/O call may specify a particular file offset, e.g., an offset from which to begin reading data or an offset to which to begin writing data. As indicated in block 604, the I/O conversion filter driver 200 may map the original offset specified in the original I/O call to a different offset. The I/O conversion filter driver 200 may utilize knowledge of both of the virtual disk image formats used by the two virtualization environments in order to determine how the offset should be mapped. In some embodiments the I/O conversion filter driver 200 may be configured to read the metadata header from the virtual disk image file and may use information in the metadata to determine how to map the offset or how to translate the I/O call in other ways.

As indicated in block 605, the I/O conversion filter driver 200 may direct a modified I/O call to the virtual disk image file, e.g., by replacing the original I/O call with the modified I/O call. The modified I/O call may use the different file offset determined in block 604 instead of the original file offset specified in the original I/O call.

Figure 5:
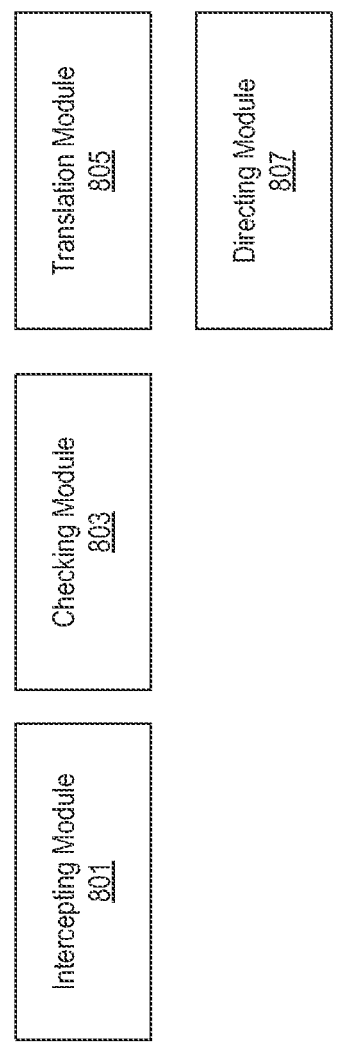
FIG. 5 illustrates various modules of an I/O conversion filter driver executable to translate the I/O call.

The I/O conversion filter driver 200 may be implemented as one or more software programs or modules that operate to perform the functionality described above. FIG. 5 illustrates various modules of the I/O conversion filter driver 200 according to one embodiment. In the illustrated embodiment the I/O conversion filter driver 200 includes an intercepting module 801 that may perform the functionality of intercepting the I/O calls from the virtualization environment 1, a checking module 803 that may perform the functionality of checking whether the I/O calls need to be translated, a translation module that may perform the functionality of translating the I/O calls, and a directing module 807 may perform the functionality of directing the translated I/O calls to the virtual disk image file.

Figure 6:
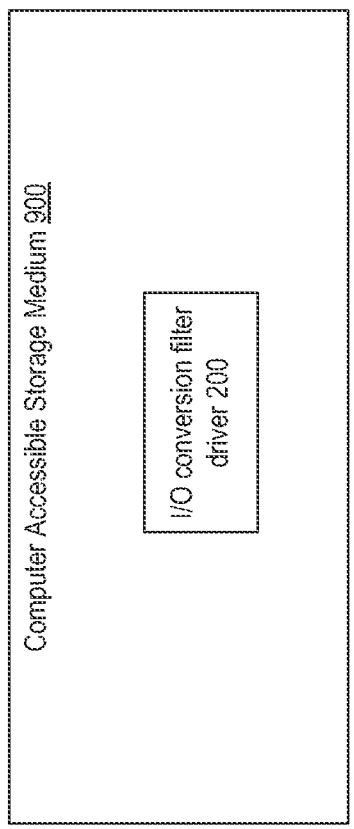
FIG. 6 is a block diagram of a computer accessible storage medium storing program instructions.

Turning now to FIG. 6, a block diagram of a computer accessible storage medium 900 is shown. The computer accessible storage medium 900 may store program instructions executable by one or more processors to implement various functions described above, such as program instructions associated with the I/O conversion filter driver 200. Generally, the computer accessible storage medium 900 may store any set of instructions which, when executed, implement a portion or all of the functions described above for enabling one type of virtualization environment to use a virtual disk image file formatted according to a virtual disk image format used by another type of virtualization environment.

Generally speaking, a computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by one or more processors to:

intercept a first virtual disk input/output call from a first virtualization environment that uses a first virtual disk image format, wherein the first virtual disk input/output call is created by the first virtualization environment based on the first virtual disk image format;

translate the first virtual disk input/output call into a second virtual disk input/output call based on a second virtual disk image format used by a second virtualization environment; and direct the second virtual disk input/output call to a virtual disk image file created by the second virtualization environment, wherein the virtual disk image file is formatted according to the second virtual disk image format;

wherein the first virtual disk input/output call specifies a first file offset;

wherein in translating the first virtual disk input/output call into the second virtual disk input/output call, the program instructions are executable by the one or more processors to map the first file offset to a second file offset, wherein the second virtual disk input/output call specifies the second file offset;

wherein the program instructions are executable by the one or more processors to direct the second virtual disk input/output call to the virtual disk image file created by the second virtualization environment by passing the second virtual disk input/output call to a file system in which the virtual disk image file is stored.

2. The non-transitory computer-accessible storage medium of claim 1, wherein the one or more processors are one or more processors of a first computer system, wherein the first virtual disk input/output call originates from the first virtualization environment on a second computer system coupled to the first computer system by a network.

3. The non-transitory computer-accessible storage medium of claim 1, wherein the program instructions are further executable by the one or more processors to determine whether or not the first virtual disk input/output call originated from the first virtualization environment;

wherein the program instructions are executable by the one or more processors to perform said translating the first virtual disk input/output call into the second virtual disk input/output call in response to determining that the first virtual disk input/output call did originate from the first virtualization environment.

4. The non-transitory computer-accessible storage medium of claim 1, wherein the first virtual disk input/output call is a first call for reading data, wherein the first virtual disk input/output call is created by the first virtualization environment based on the first virtual disk image format;

wherein the second virtual disk input/output call is a second call for reading data from the second virtual disk image format.

5. The non-transitory computer-accessible storage medium of claim 1, wherein the first virtual disk input/output call is a first call for writing data, wherein the first virtual disk input/output call is created by the first virtualization environment based on the first virtual disk image format;

wherein the second virtual disk input/output call is a second call for writing data to the second virtual disk image format.

6. The non-transitory computer-accessible storage medium of claim 1, wherein the program instructions are further executable by the one or more processors to instantiate a virtual machine in the first virtualization environment from the virtual disk image file created by the second virtualization environment;

wherein the program instructions are executable to intercept the first virtual disk input/output call from the first virtualization environment in response to the first virtualization environment using the virtual machine.

7. The non-transitory computer-accessible storage medium of claim 1, wherein the program instructions are executable by the one or more processors to instantiate the virtual machine in the first virtualization environment from the virtual disk image file without first converting the virtual disk image file into the first virtual disk image format.

8. The non-transitory computer-accessible storage medium of claim 1, wherein the first virtual disk image format is a VMDK (Virtual Machine Disk Format) file format.

9. The non-transitory computer-accessible storage medium of claim 1, wherein the first virtual disk image format is a VHD (Virtual Hard Disk) file format.

10. The non-transitory computer-accessible storage medium of claim 1, wherein the second virtual disk image format is a VMDK (Virtual Machine Disk Format) file format.

11. The non-transitory computer-accessible storage medium of claim 1, wherein the second virtual disk image format is a VHD (Virtual Hard Disk) file format.

12. The non-transitory computer-accessible storage medium of claim 1, wherein the first virtual disk image format is a VMDK (Virtual Machine Disk Format) file format; and wherein the second virtual disk image format is a VHD (Virtual Hard Disk) file format.

13. The non-transitory computer-accessible storage medium of claim 1, wherein the first virtual disk image format is a VHD (Virtual Hard Disk) file format.

wherein the second virtual disk image format is a VMDK (Virtual Machine Disk Format) file format.

14. A method comprising:

intercepting a first virtual disk input/output call from a first virtualization environment that uses a first virtual disk image format, wherein the first virtual disk input/output call is created by the first virtualization environment based on the first virtual disk image format;

translating the first virtual disk input/output call into a second virtual disk input/output call based on a second virtual disk image format used by a second virtualization environment; and directing the second virtual disk input/output call to a virtual disk image file created by the second virtualization environment, wherein the virtual disk image file is formatted according to the second virtual disk image format;

wherein the first virtual disk input/output call specifies a first file offset;

wherein in translating the first virtual disk input/output call into the second virtual disk input/output call, the program instructions are executable by the one or more processors to map the first file offset to a second file offset, wherein the second virtual disk input/output call specifies the second file offset;

wherein the program instructions are executable by the one or more processors to direct the second virtual disk input/output call to the virtual disk image file created by the second virtualization environment by passing the second virtual disk input/output call to a file system in which the virtual disk image file is stored.

15. A system comprising:

one or more processors; and memory storing program instructions, wherein the program instructions are executable by the one or more processors to:

intercept a first virtual disk input/output call from a first virtualization environment that uses a first virtual disk image format, wherein the first virtual disk input/output call is created by the first virtualization environment based on the first virtual disk image format;

translate the first virtual disk input/output call into a second virtual disk input/output call based on a second virtual disk image format used by a second virtualization environment; and direct the second virtual disk input/output call to a virtual disk image file created by the second virtualization environment, wherein the virtual disk image file is formatted according to the second virtual disk image format;

wherein the first virtual disk input/output call specifies a first file offset;

wherein in translating the first virtual disk input/output call into the second virtual disk input/output call, the program instructions are executable by the one or more processors to map the first file offset to a second file offset, wherein the second virtual disk input/output call specifies the second file offset;

wherein the program instructions are executable by the one or more processors to direct the second virtual disk input/output call to the virtual disk image file created by the second virtualization environment by passing the second virtual disk input/output call to a file system in which the virtual disk image file is stored.

* * * * *